US008982954B2

(12) United States Patent
Jeon

(10) Patent No.: US 8,982,954 B2
(45) Date of Patent: Mar. 17, 2015

(54) METHOD OF DETERMINING MOTION VECTORS FOR BI-PREDICTIVE IMAGE BLOCK

(71) Applicant: LG Electronics Inc., Seoul (KR)

(72) Inventor: Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/080,073

(22) Filed: Nov. 14, 2013

(65) Prior Publication Data

US 2014/0072050 A1  Mar. 13, 2014

Related U.S. Application Data

(60) Continuation of application No. 11/523,598, filed on Sep. 20, 2006, now Pat. No. 8,638,857, which is a division of application No. 10/337,611, filed on Jan. 6, 2003, now Pat. No. 8,565,305.

(30) Foreign Application Priority Data

May 3, 2002 (KR) .................. 10-2002-0024470
Dec. 5, 2002 (KR) .................. 10-2002-0076899

(51) Int. Cl.
*H04N 7/12* (2006.01)
*H04N 11/02* (2006.01)
(Continued)

(52) U.S. Cl.
CPC ... *H04N 19/00151* (2013.01); *H04N 19/00715* (2013.01); *H04N 19/00727* (2013.01); *H04N 19/00163* (2013.01); *H04N 19/0029* (2013.01); *H04N 19/00054* (2013.01); *H04N 19/00921* (2013.01); *H04N 19/0026* (2013.01); *H04N 19/00587* (2013.01); *H04N 19/00733* (2013.01); *H04N 19/00024* (2013.01);
(Continued)

(58) Field of Classification Search
USPC ........... 375/240.12, 240.15, 240.16; 382/325, 382/326, 328
See application file for complete search history.

(56) References Cited

U.S. PATENT DOCUMENTS 5,282,049 A  1/1994 Hatakenaka et al.
5,305,113 A  4/1994 Iwamura et al.
(Continued)

FOREIGN PATENT DOCUMENTS

DE  10300529 A1  11/2003
EP  0863674 A2   9/1998
(Continued)

OTHER PUBLICATIONS

Working Draft No. 2, Revision 8 (WD-2 rev 8) Joint Video Team (JVT) of ISO/IEC MPEG and ITU-T VCEG, Geneva; Jan. 29-Feb. 1, 2002; pp. 1, 22 and 64-68.
(Continued)

*Primary Examiner* — Jeremaiah C Hallenbeck-Huber
(74) *Attorney, Agent, or Firm* — McKenna Long & Aldridge LLP

(57) ABSTRACT

In one embodiment, the method includes determining a motion vector of a current image block equal to a motion vector of an image block based on a reference picture index indicating a reference picture for the image block. For example, the motion vector of the current image block may be equal to the motion vector of the image block if the reference picture index indicates a long-term reference picture for the image block.

2 Claims, 5 Drawing Sheets

(51) Int. Cl.
  H04N 11/04    (2006.01)
  H04N 19/139   (2014.01)
  H04N 19/51    (2014.01)
  H04N 19/583   (2014.01)
  H04N 19/142   (2014.01)
  H04N 19/179   (2014.01)
  H04N 19/114   (2014.01)
  H04N 19/87    (2014.01)
  H04N 19/17    (2014.01)
  H04N 19/105   (2014.01)
  H04N 19/172   (2014.01)
  H04N 19/176   (2014.01)
  H04N 19/159   (2014.01)
  H04N 19/61    (2014.01)
  H04N 19/103   (2014.01)
  H04N 19/577   (2014.01)
  H04N 19/56    (2014.01)
  H04N 19/503   (2014.01)
  H04N 19/527   (2014.01)
  H04N 5/14     (2006.01)

(52) U.S. Cl.
  CPC .. *H04N 19/00266* (2013.01); *H04N 19/00278* (2013.01); *H04N 19/00218* (2013.01); *H04N 19/00781* (2013.01); *H04N 19/00684* (2013.01); *H04N 19/00018* (2013.01); *H04N 19/00721* (2013.01); *H04N 19/0066* (2013.01); *H04N 19/00575* (2013.01); *H04N 19/00696* (2013.01); *H04N 19/00709* (2013.01); *H04N 19/00593* (2013.01); *H04N 5/145* (2013.01); *H04N 5/147* (2013.01)
  USPC .................................................... 375/240.16

(56) References Cited

U.S. PATENT DOCUMENTS

| | | | |
|---|---|---|---|
| 5,911,008 A | 6/1999 | Niikura et al. | |
| 5,943,445 A | 8/1999 | Dufaux | |
| 6,381,275 B1 | 4/2002 | Fukuhara et al. | |
| 6,647,061 B1 | 11/2003 | Panusopone et al. | |
| 6,775,326 B2 | 8/2004 | Sekiguchi et al. | |
| 7,003,035 B2 | 2/2006 | Tourapis et al. | |
| 2002/0001347 A1 | 1/2002 | Rhee | |
| 2002/0009203 A1 | 1/2002 | Erten | |
| 2002/0092030 A1 | 7/2002 | Gu | |
| 2004/0057523 A1 | 3/2004 | Koto et al. | |
| 2004/0146109 A1 | 7/2004 | Kondo et al. | |

FOREIGN PATENT DOCUMENTS

| | | |
|---|---|---|
| EP | 0898427 A1 | 2/1999 |
| EP | 1148732 A2 | 10/2001 |
| JP | 09187015 | 7/1997 |
| JP | 10257495 | 9/1998 |
| JP | 11075191 | 3/1999 |
| WO | WO-98/36576 A1 | 8/1998 |
| WO | WO-01/33864 A1 | 5/2001 |
| WO | WO-01/86960 A2 | 11/2001 |

OTHER PUBLICATIONS

Office Action dated Jun. 22, 2010 from the USPTO for U.S. Appl. No. 11/043,093.
German Office Action dated Jul. 17, 2010, issued in Application No. DE103 62 222 and English Translation thereof.
German Office Action dated Oct. 4, 2010, issued in Application No. DE 103 62 270.5-55 and English Translation thereof.
Joint Video Team (JVT) of ISO/IEC/MPEG and ITU-T VCEG, T. Wiegand "Working Draft No. 2, Revision 2 (WD-2)", Geneva Switzerland, Feb. 2002.
Search Report from the Netherland Patent Office dated Jan. 19, 2010 for counterpart Dutch application NL1028855.
German Office Action dated Nov. 29, 2006 for DE 103 00 529.3-55.
Joint Video Team (JVT) of ISO/IEC/MPEG and ITU-T VCEG of Mar. 15, 2002, pp. 1-7, 38-39, and 60-69.
German Office Action dated Mar. 3, 2009 for DE 103 62 222.5-55.
European Search Report dated Jul. 26, 2006 EP05021832.
Russian Office Action dated Jan. 27, 2006 for Application No. 2004133542/09(036476).
British Search Report dated Nov. 15, 20005 for GB14852.3.
Working Draft No. 2, Revision 8 (WD-2 rev 8) Joint Video Team (JVT) of ISO/IEC MPEG and ITU-T VCEG, Geneva; Jan. 29-Feb. 1, 2002; pp. 1-38.
Brice R. Newnes Guide to Digital Television Chapter 5, 2000.
British Office Action dated Aug. 26, 2005 for GB0425252.4.
Japanese Office Action dated Jul. 12, 2005 for JP2003-002604.

METHOD OF DETERMINING MOTION VECTORS FOR BI-PREDICTIVE IMAGE BLOCK

PRIORITY INFORMATION

This is a continuation of U.S. application Ser. No. 11/523,598 filed Sep. 20, 2006; which is a divisional of U.S. application Ser. No. 10/337,611 filed Jan. 6, 2003; which claims priority under 35 U.S.C. 119 on Korean Application No. 10-2002-0024470 filed May 3, 2002 and Korean Application No. 10-2002-0076899 filed Dec. 5, 2002; the contents of each of which are hereby incorporated by reference in their entirety.

BACKGROUND OF THE INVENTION

1. Field of the Invention

The present invention relates to a moving picture coding system, and more particularly, to a moving picture coding method to enhance coding efficiency.

2. Description of the Related Art

It is desirable to detect a scene change in a sequence of moving pictures so as to compress and code a moving picture sequence optimally. This is because many video applications, such as the news, sports broadcasting, a close-up conversation like an interview, multi-point video conferencing, etc., include repeated scene changes. A scene change can occur for an entire picture or in some area of the picture.

The digital image coding method may be changed whenever a scene change is detected. For example, since similarity is very low between a picture in a new scene and a picture in a previous scene, a picture after a scene change is coded using an intra mode in which a picture is coded using prediction only from decoded samples within the same picture rather than by an inter mode in which a picture is coded by motion compensation from previously-decoded reference pictures.

In more detail, a picture in which a scene change occurs in the entire picture, is an intra picture that is coded in the intra mode on all image blocks forming the picture. Meanwhile, in the case of a picture in which a scene change occurs at some area, all blocks within the areas in which scene changes occur are coded in the intra mode. Since the intra mode coding generates more bits as compared with inter mode coding, a sequence in which scene changes occur very frequently results in low bit rate coding.

Inter mode coding may produce P pictures and B pictures. Generally, when using a B picture in a moving picture coding system, the coding order is different from the displaying order.

FIG. 1 illustrates an example display order including B pictures. As shown in FIG. 1, an intra picture I is displayed first among pictures to be displayed. Two B pictures B1 and B2 are displayed after the intra picture I. A P picture P3 is displayed after the B pictures B1 and B2 are displayed. The fourth and fifth B pictures B4 and B5 are displayed after the P picture P3 is displayed, and subsequently, a P picture P6 is displayed. This pattern continues to repeat until the next I picture.

However, the coding order of a digital image is not the same as the display order. In other words, the P picture is coded prior to the B picture.

FIG. 2 illustrates an example coding order associated with the display order of FIG. 1. As shown in FIG. 2, if an intra picture I is coded, the P picture P3 is coded and then the two B pictures B1 and B2 that are displayed prior to the P picture P3 are coded. After that, pictures P6, B4, B5, P9, B7, B8, P12, B10 and B11 are coded.

Here, the B pictures have five coding modes such as intra mode, forward mode, backward mode, bi-predictive mode and direct mode. The bi-predictive mode uses two reference pictures. The two reference pictures are both located prior to or after the B picture or one of them is located prior to the B picture and the other is located after the B picture.

The direct mode utilizes temporal redundancy to maintain motion continuity between two adjacent pictures. In other words, in the direct mode, a forward motion vector and a backward motion vector of the direct mode for the B picture are derived from the motion vector of a co-located block in a subsequent picture located just after the B picture. Such a direct mode does not need overhead bits such as motion information so that the bit rate can be reduced.

Here, the forward motion vector $MV_f$ and the backward motion vector $MV_b$ of the conventional direct mode are obtained by scaling the motion vector MV using a time distance between pictures when the co-located block in a subsequent picture has a motion vector MV. In other words, the forward motion vector $MV_f$ and the backward motion vector $MV_b$ are determined using the following Equations 1 and 2 below:

$$MVf = \frac{TRb * MV}{TRd} \quad \text{Equation 1}$$

$$MVb = \frac{(TRd - TRb) * MV}{Trd} \quad \text{Equation 2}$$

where MV is the motion vector of the co-located block in the subsequent picture, $MV_f$ is the forward motion vector of the direct mode for a B picture, $MV_b$ is the backward motion vector of the direct mode for the B picture, TRd is a time distance between the subsequent picture and a reference picture pointed by the motion vector of the co-located block in the subsequent picture, and TRb is a time distance between a B picture and a reference picture pointed by the motion vector of the co-located block in the subsequent picture.

In the direct mode, two motion-compensated blocks are obtained using the two motion vectors $MV_f$ and $MV_b$, and a prediction block is obtained by averaging or interpolative calculation of the two motion-compensated blocks.

SUMMARY OF THE INVENTION

The present invention relates to a method of determining a motion vector of a current image block.

In one embodiment, the method includes determining a motion vector of a current image block equal to a motion vector of an image block based on a reference picture index indicating a reference picture for the image block. For example, the motion vector of the current image block may be equal to the motion vector of the image block if the reference picture index indicates a long-term reference picture for the image block.

In one embodiment, another motion vector of the current image block may be set equal to zero if the reference picture index indicates a long-term reference picture for the image block.

In another embodiment, the motion vectors of the current image block are determined by scaling the motion vector of the image block if the reference picture index does not indicate a long-term reference picture for the image block.

According to yet another embodiment of the present invention, a reference picture index of an image block is obtained. The image block has a motion vector, and the reference picture index indicates a reference picture of the image block. A motion vector for the current image block is determined equal to the motion vector of the image block based on the obtained reference picture index.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the example embodiments of the present invention that are illustrated in the accompanying drawings. Wherever possible, the same reference numbers will be used throughout the drawings to refer to the same or like parts.

To begin with, before an embodiment of the present invention is described, in moving pictures having a scene change, a picture in which a scene change occurs entirely in the picture is defined as a scene cut picture and a picture in which a scene change occurs partially in the picture is defined as a partial scene change picture.

Figure 1:
FIG. 1 illustrates an example display order including B pictures.
Figure 2:
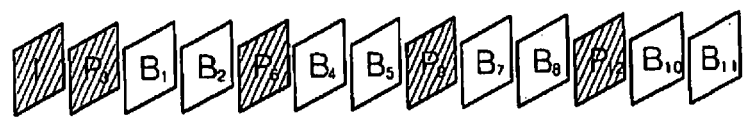
FIG. 2 illustrates an example coding order associated with the display order of FIG. 1.
Figure 3A:
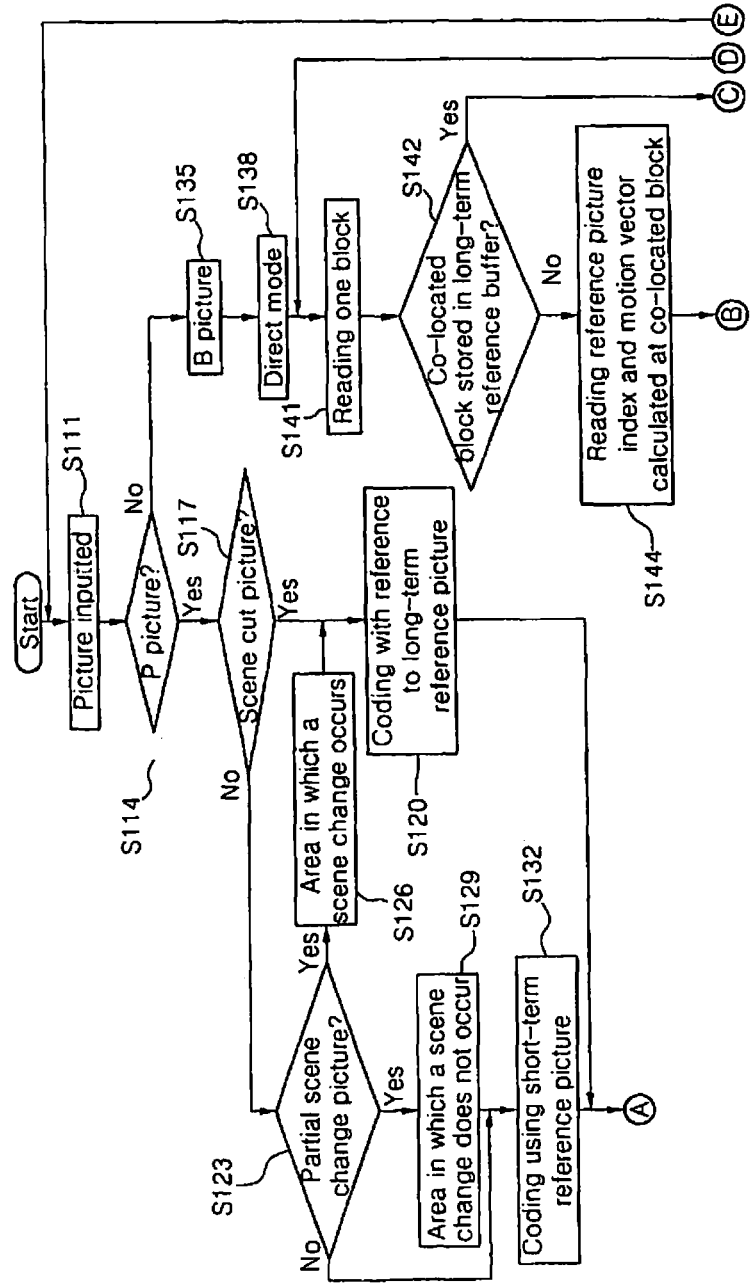
FIGS. 3A to 3B are flowcharts illustrating a method of coding a moving picture sequence in a moving picture coding system according to an example embodiment of the present invention.
Figure 3B:
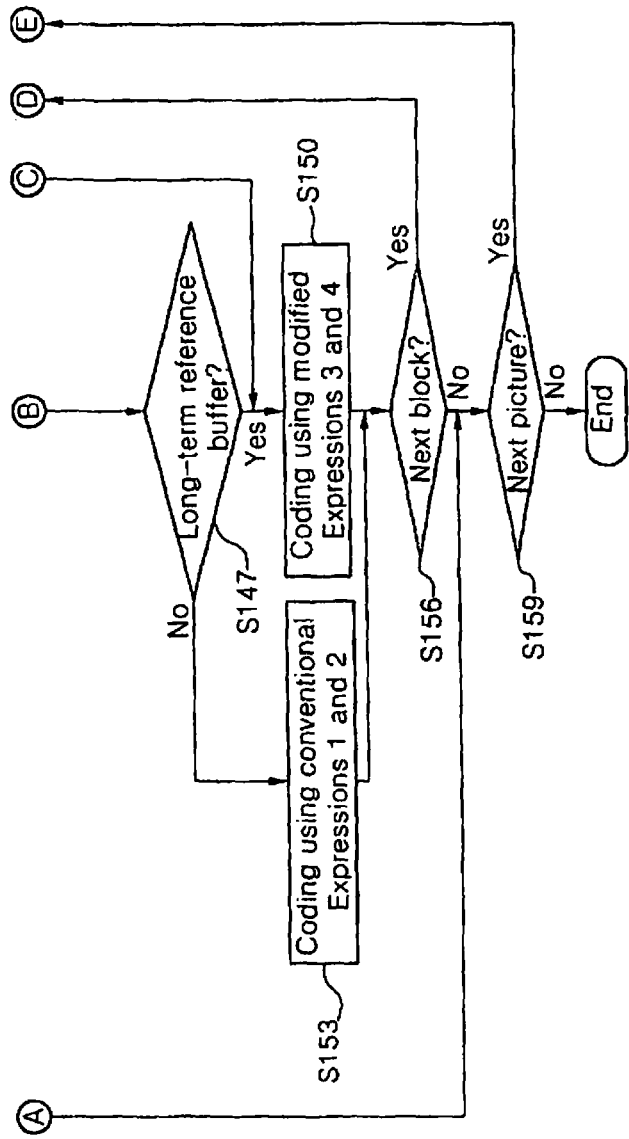

FIGS. 3A and 3B are flowcharts illustrating a method of coding a moving picture sequence in a moving picture coding system according to an example embodiment of the present invention. Referring to FIGS. 3A and 3B, pictures are sequentially input from a moving picture sequence (S111).

Kinds of pictures are determined (S114). In other words, it is determined whether the input picture is a P picture or a B picture. Here, in this embodiment of the present invention, it is assumed that a coding with respect to an intra picture is completed in advance.

If a picture is a P picture, it is determined whether or not a scene change occurs in the P picture (S117). Here, the scene change is determined by comparing the P picture with a picture (P picture or B picture) displayed just before the P picture.

If the scene is changed entirely among the P pictures, the P picture is a scene cut picture. If the P picture is determined as the scene cut picture, a coding is carried out with reference to a long-term reference picture (S120).

If the P picture is not a scene cut picture, it is determined whether or not the P picture is a partial scene change picture (S123).

If the P picture is a partial scene change picture, blocks contained in an area in which the scene is changed are coded with reference to the long-term reference picture as in step S120 (S126).

Blocks contained in an area in which the scene is not changed are coded with reference to a short-term reference picture (S129, S132).

Here, the long-term reference picture is a picture stored in a long-term reference buffer, and the short-term reference picture is a picture stored in a short-term reference buffer.

The short-term reference buffer is provided with a first-input, first-output (FIFO) buffer in which a picture first input is output first, and the pictures coded a relatively short time ago are stored in the short-term reference buffer.

The pictures coded a relatively long time ago are stored in the long-term reference buffer. And, pictures of respective scene sets, e.g., an intra picture, the scene cut picture, the partial scene change picture and the like are stored in the long-term reference buffer.

Figure 4:
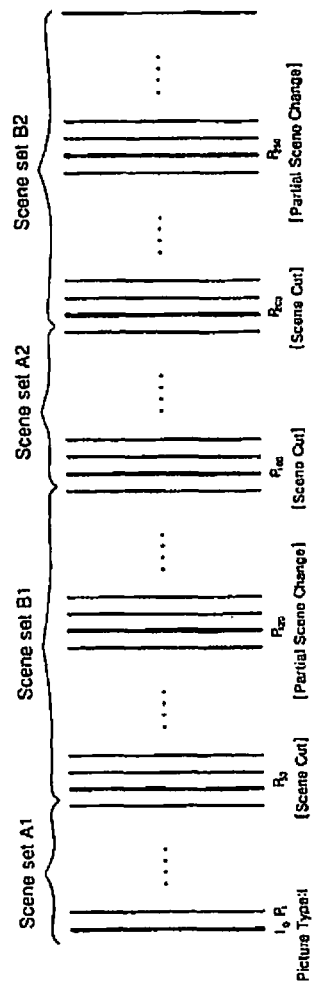
FIG. 4 illustrates a method of coding a moving picture sequence in which a scene change occurs according to an example embodiment of the present invention.

Next, an example of scene sets and scene changes will be described to assist in understanding principles of the present invention. It should be understood that this is a non-limiting example. As shown in FIG. 4, an intra picture I0 that is first scene cut picture of a scene set A1, a first scene cut picture P50 of a scene set B1 and a first partial scene change picture P120 can be stored in the long-term reference buffer. Here, a scene set is a set of similar pictures. For example, suppose the pictures represent a discussion program where an announcer appears, then a panel A appears, then the announcer appears again and then the panel A appears again. The scene where the announcer first appears is scene set A1, and the scene where the panel A subsequently appears is scene set B1. The scene where the announcer appears again is scene set A2, and the scene where the panel A appears again is scene set B2. As described above, when a scene change occurs, the P picture is coded in the inter mode with reference to a short-term reference or a long-term reference picture instead of being coded in the intra mode. This reduces the amount of the bits to enhance coding efficiency.

Description of the steps S117 to S132 in FIG. 3A will be made with reference FIG. 4. As shown in FIG. 4, if the P picture P200 to be coded now is the scene cut picture belonging to the scene set B2, the short-term reference pictures stored in the short-term reference buffer are not used. The scene cut picture P200 is the first picture of the scene set B2, and the scene set of the scene cut picture P200 is different from the short-term reference pictures such as P199, P198, P197, etc., belonging to the scene set A2. The similarity of the scene cut picture P200 and the short-term reference pictures belonging to the scene set A2 is not great (e.g., P200 is part of the scene of panel A and P199 is part of the scene of the announcer in the above described example), and precise coding cannot be achieved from such reference pictures.

In this case, the P picture is coded in inter mode with reference to the reference pictures P50 and P120 belonging to a scene set B1, which is a similar scene to the scene of scene set B2 (e.g., both are scenes of panel A in the above-described example).

On the other hand, if a partial scene change occurs in the P picture P250, the coding is performed differently depending on two conditions. In other words, the blocks included in the area where a partial scene change occurs are coded in inter mode with reference to the long-term reference pictures P50 and P120 stored in the long-term reference buffer. The blocks included in the area where a partial scene change does not occur are coded in inter mode with reference to the short-term reference pictures P249, P248, P247, etc., stored in the short-term reference buffer.

As described above, after one P picture is coded, if a next picture exists (S159), then the next picture is input (S111).

Returning to step S114, if the picture input in step S111 is a B picture, then five prediction modes (intra mode, forward mode, backward mode, bi-predictive mode and direct mode) are tested and one of them is selected as an optimal coding mode (S135, S138). In this specification, the direct mode will be described mainly.

First, one block of the B picture is read (S141). Of course, the other blocks can be read subsequently. Then, a kind or type of a reference buffer storing a specified picture is examined. Namely, the type of reference picture (e.g., long or short) is examined.

The specified picture is determined of the earlier pictures than the B picture in the coding order regardless of the display order. In other words, the specified picture is one of the reference pictures used to code the B picture. Therefore, the specified picture can be a short-term reference picture or a long-term reference picture. The reference pictures may be before or after the B picture in display order and they are stored in the short-term reference buffer and/or stored in the long-term reference buffer. If the specified picture is a long-term reference picture, the forward motion vector of direct mode for the B picture is set as a motion vector of the co-located block in the specified picture. The backward motion vector of direct mode for the B picture is determined to be zero (S150). However, if the specified picture is a short-term reference picture, the reference picture index and the motion vector calculated at the co-located block in the specified picture are read (S144). The reference picture index and the motion vector is calculated previously and stored in the system buffer. According to the reference picture index, it is determined whether the motion vector of the co-located block in the specified picture points to a long-term reference picture (S147). As described above, the short-term and long-term reference pictures are stored in the short-term reference buffer and the long-term reference buffer, respectively.

If the motion vector of the co-located block in the specified picture points to the long-term reference picture, the B picture is coded using the following expressions 3 and 4 (S150):

$$MVf=MV \quad \text{Expression 3}$$

where MV is a motion vector of the co-located block in the specified picture, and MVf is a forward motion vector of direct mode for the B picture; and $$MVb=0 \quad \text{Expression 4}$$

where MV is a motion vector of the co-located block in the specified picture, and MVb is a backward motion vector of direct mode for the B picture In other words, if the motion vector of the co-located block in the specified picture points to the long-term reference picture, the forward motion vector in the direct mode for the B picture is the motion vector of the co-located block in the specified picture and the backward motion vector is zero.

Figure 5:
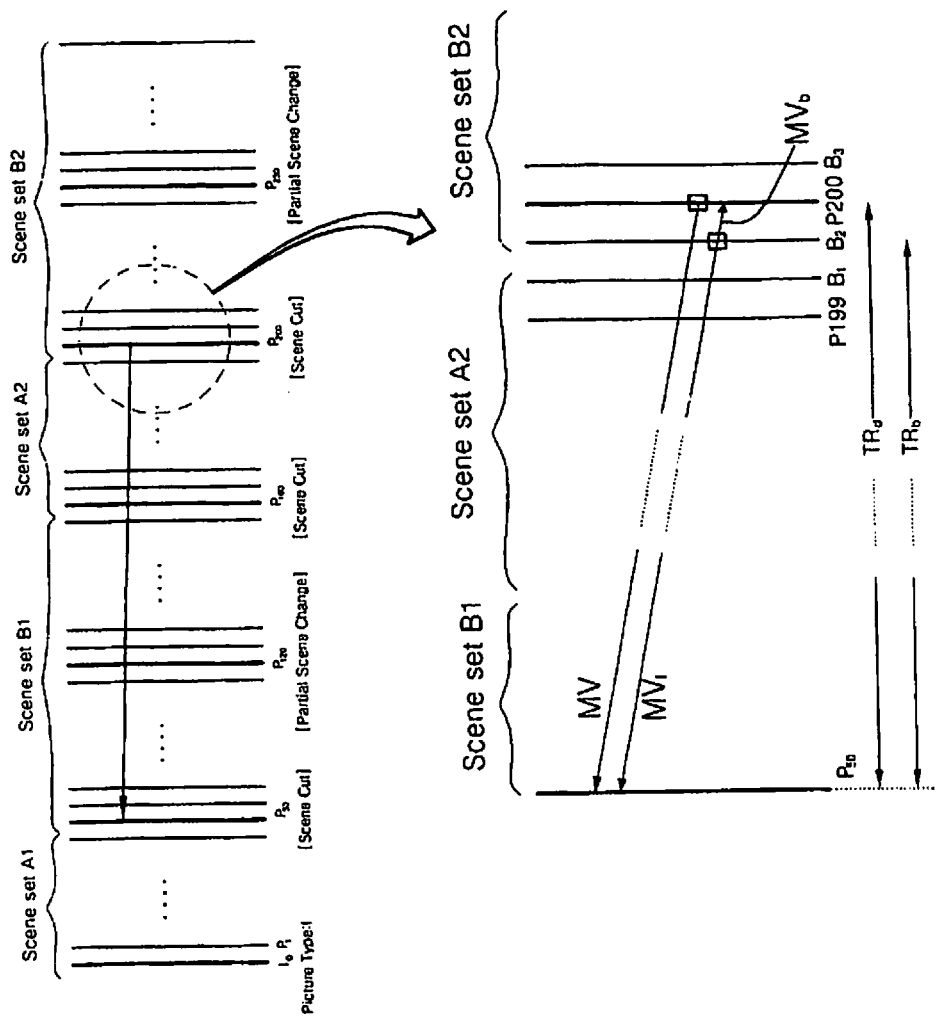
FIG. 5 illustrates a method of coding a B picture in direct mode according to an example embodiment of the present invention.

As shown in FIG. 5, in the step S150, if the motion vector of the co-located block in the specified picture P200 points to the long-term reference picture P50, TRd and TRb are meaningless in the conventional expressions 1 and 2.

Referring to FIG. 5, a more detailed description will be made. When inserting two B pictures B1 and B2 into a moving picture sequence and coding them, the P picture P200 that is earlier than the B1 and B2 pictures in coding order is coded first. Here, since the P picture P200 is a scene cut picture in which a scene change occurs, the P picture P200 is coded in inter mode from the long-term reference picture P50 stored in the long-term reference buffer. According to the coding order, the next picture to be coded is the B1 picture. Since the B1 picture belongs to the scene set A2, most blocks thereof are coded in a forward mode from the short-term reference pictures belonging to the scene set A2 or in bi-predictive mode in which both of the two reference pictures belong to the scene set A2. However, intra mode, backward mode or bi-predictive mode from the P picture P200 belonging to the other scene set B2, and direct mode to obtain motion vectors of the direct mode from the co-located block in the P picture P200 are probably not used as the coding mode for the blocks in the B1 picture.

Differently, since not only the B2 picture but also the specified picture P200 used for motion vectors of the direct mode for the B2 picture belong to the same scene set B2, the direct mode is selected as a coding mode for most blocks in the B2 picture. In other words, after obtaining the motion vector of each block in the specified picture P200 in the inter mode from the long-term reference picture P50 belonging to the same scene set B2, the motion vectors of direct mode in the B2 picture are calculated from the motion vector of the co-located block in the specified picture P200. Since the B2 picture and the specified picture P200 belong to the scene set B2, and the similarity between the scene set B1 to which the reference picture P50 belongs and the scene set B2 is very high, the direct mode can be selected as a coding mode for most blocks in the B2 picture. Accordingly, the coding efficiency for the B2 picture is improved.

On the other hand, if the motion vector of the co-located block in the specified picture points to a short-term reference picture, the B picture is coded using the conventional Expressions 1 and 2 (S153). In this time, since the short-term reference picture stored in the short-term reference buffer belongs to the same scene set as the B picture and another scene set does not exist between the specified picture and the short-term reference picture, the forward motion vector and the backward motion vector of direct mode are determined using the conventional Expressions 1 and 2 related to TRd and TRb representing time distance.

After one block of a B picture is coded, the next block (if it exists) in the B picture is read and coded subsequently (S156). Such processes are performed on the blocks in the B picture. After the B picture is coded, the next picture (if it exists) is input (S159 and S111) and coded so that a moving picture coding is achieved.

As described above, according to a moving picture coding method of the present invention, the forward motion vector and the backward motion vector in the direct mode for the B picture are determined differently based on the type of reference picture pointed to by the motion vector of the co-located block in the specified picture. When coding the B picture, the direct mode is mainly used as the coding mode to enhance coding efficiency.

According to the moving picture coding method of the present invention, the P picture in which a scene change occurs is coded in inter mode using motion compensation from a long-term reference to reduce the amount of bits and enhance coding efficiency.

It will be apparent to those skilled in the art that various modifications and variations can be made in the present invention. Thus, it is intended that the present invention covers the modifications and variations of this invention.

What is claimed is:

1. A method of determining and using motion vectors for a bi-predictive image block, the method performed by a moving picture coding system and comprising:

obtaining, by the moving picture coding system, a motion vector of a co-located image block for the bi-predictive image block, wherein the co-located image block is in a subsequent picture of the bi-predictive picture;

determining, by the moving picture coding system, motion vectors of the bi-predictive image block based on a type of temporal distance information between a reference picture for the co-located image block and the bi-predictive block, the type of the temporal distance information being one of a first type and a second type, the second type being longer than the first type, the determining step determining the motion vectors from the motion vector of a co-located image block according to a first set of expressions if the type of the temporal distance information is the first type and the determining step determining the motion vectors from the motion vector of a co-located image block according to a second set of expressions if the type of the temporal distance information is the second type, the second set of expressions being different than the first set of expressions; and decoding, by the moving picture coding system, the bi-predictive image block based on the determined motion vectors.

2. The method of claim 1, wherein the first type is a short term type and the second type is a long term type.

* * * * *